F. W. YOUNG & E. HEITMANN
LINING FOR SLOTS OF DYNAMO ELECTRIC MACHINE ELEMENTS.
APPLICATION FILED JUNE 5, 1909.

941,181.                                            Patented Nov. 23, 1909.

Witnesses:
Samuel W. Balch
Frank C. Cole.

Inventors,
Frederick Wm. Young,
Edward Heitmann,
by Thomas Ewing Jr.,
Attorney.

UNITED STATES PATENT OFFICE.

FREDERICK WILLIAM YOUNG, OF EAST ORANGE, AND EDWARD HEITMANN, OF MONTCLAIR, NEW JERSEY, ASSIGNORS TO CROCKER-WHEELER COMPANY, OF AMPERE, NEW JERSEY, A CORPORATION OF NEW JERSEY.

LINING FOR SLOTS OF DYNAMO-ELECTRIC-MACHINE ELEMENTS.

941,181.      Specification of Letters Patent.      Patented Nov. 23, 1909.

Application filed June 5, 1909. Serial No. 500,284.

*To all whom it may concern:*

Be it known that we, FREDERICK WILLIAM YOUNG, residing at East Orange, in the county of Essex and State of New Jersey, and EDWARD HEITMANN, residing at Montclair, in the county of Essex and State of New Jersey, both citizens of the United States of America, have invented a new and useful Improvement in Linings for Slots of Dynamo-Electric-Machine Elements, of which the following is a specification.

Our invention relates particularly to means for lining that portion of the walls of the coil-containing slots of a laminated dynamo-electric machine element which are engaged by the bridging blocks for holding the windings in place.

The object is to provide means for electrically insulating the blocks from the laminæ which will be of minimum thickness so as not to interfere with the magnetic functions of the bridging-blocks or encroach materially on the space in the slots required for the windings. A further object is to facilitate the assembling of the bridging-blocks.

Figure 1:
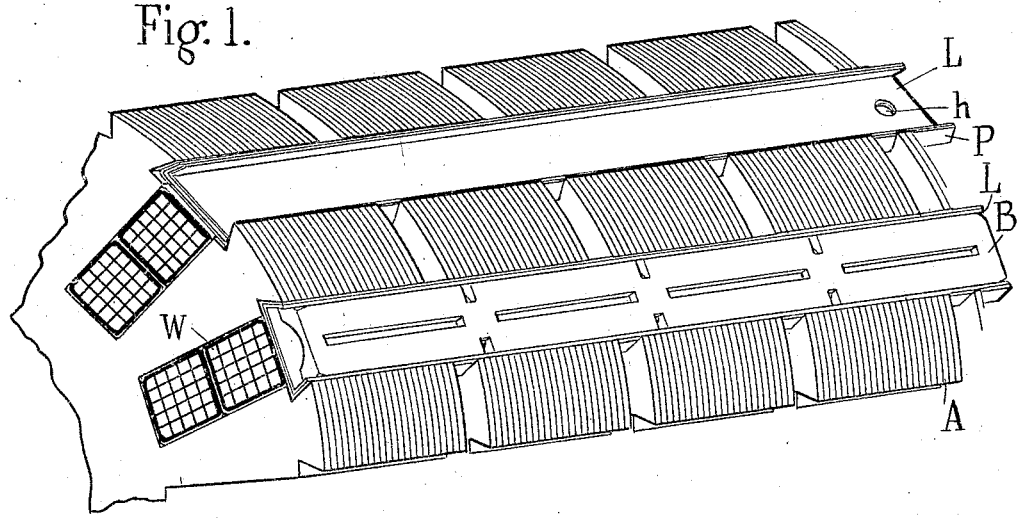
Figure 2:
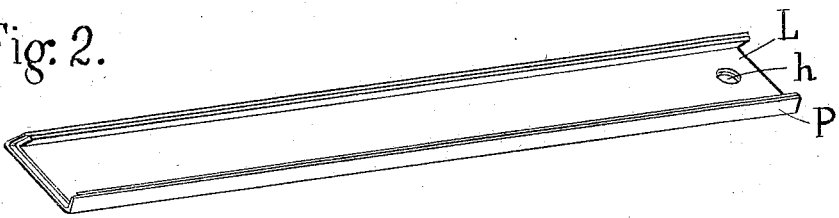

In the accompanying sheet of drawings which forms a part of this application—Figure 1 is a perspective of a portion of a dynamo-electric machine element, with windings in section, bridging-blocks and linings constructed in accordance with our invention. Fig. 2 is a perspective of one of the lining troughs.

The invention is illustrated in connection with a laminated toothed armature A, constituting a dynamo-electric machine element with slots containing windings or coils W. The walls of the slots near their mouths and above the windings are inclined, forming dovetail shaped channels. Into the channels thereby formed are inserted trough-shaped metallic linings L which are provided externally with coatings of paper P attached thereto with shellac. These troughs are drawn into the channels from the ends of the armature. A hole *h* near one end of each trough serves for the insertion of a hook by which they are drawn into place. When in place steel or iron bridging-blocks B are inserted from the end of the armature, and, by reason of the smooth surface afforded by the metal of the troughs, are readily driven along them and tightly wedged in place in the channels. The paper preserves the necessary insulation between laminæ, and the metallic lining protects the paper from being cut through or abraded in the operation of inserting the bridging-blocks. Paper of but five thousandths of an inch in thickness has proved suitable for the purpose, and the metallic linings of sheet steel may be kept within a thickness of two one-thousandths of an inch, thereby rendering the electrical conductivity negligible. The combined thickness of paper and metal is much less than has been found necessary for paper when used without the metallic protection. In lieu of paper the metallic linings may be coated with a hard japan or enamel.

What we claim as new, and desire to secure by Letters Patent of the United States, is—

1. The combination with a dynamo-electric machine element having coil-containing slots, of windings located in the slots, slot-closing bridging-blocks of magnetic material located in the slots, and metallic linings interposed between the walls of the slots and the bridging-blocks, the linings being insulated from the slot walls, substantially as described.

2. The combination with a dynamo-electric machine element having coil-containing slots, of windings located in the slots, slot-closing bridging-blocks of magnetic material located in the slots, and metallic linings provided with coatings of paper interposed between the walls of the slots and the bridging-blocks, the paper adjoining the slot walls, substantially as described.

3. The combination with a dynamo-electric machine element having coil-containing slots, of windings located in the slots, slot-closing bridging-blocks of magnetic material located in the slots, and externally insulated metallic troughs interposed between the walls of the slots and the bridging-blocks, substantially as described.

4. As an article of manufacture, an exteriorly insulated metallic trough of high electrical resistance the sides of which are inclined toward each other whereby it is constructed to serve as a lining interposed between the walls of a coil-containing slot of a dynamo-electric machine element and a slot-closing bridging-block, substantially as described.

5. As an article of manufacture, a metallic trough of high electrical resistance provided exteriorly with a coating of paper the sides of which are inclined toward each other whereby it is constructed to serve as a lining interposed between the walls of a coil-containing slot of a dynamo-electric machine element and a slot-closing bridging-block, substantially as described.

Signed by us at East Orange, N. J., this third day of June, 1909.

FREDERICK WILLIAM YOUNG.
EDWARD HEITMANN.

Witnesses:
ANTHONY J. PORSKIEVIES,
J. MACDONALD SMITH.